(12) United States Patent
Wu et al.

(10) Patent No.: US 8,387,068 B2
(45) Date of Patent: Feb. 26, 2013

(54) METHOD AND DEVICE FOR MANAGING OBJECT INSTANCE LABEL

(75) Inventors: Huangwei Wu, Shenzhen (CN); Ping Fang, Shenzhen (CN); Yu Zhu, Shenzhen (CN); Qinliang Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 5 days.

(21) Appl. No.: 13/161,178

(22) Filed: Jun. 15, 2011

(65) Prior Publication Data

US 2011/0247011 A1 Oct. 6, 2011

Related U.S. Application Data

(63) Continuation of application No. PCT/CN2009/075286, filed on Dec. 3, 2009.

(30) Foreign Application Priority Data

Dec. 15, 2008 (CN) .......................... 2008 1 0184698

(51) Int. Cl.
 *G06F 13/00* (2006.01)
(52) U.S. Cl. ......... 719/313; 719/315; 719/316; 719/330
(58) Field of Classification Search .................. 719/313, 719/315, 316, 330
See application file for complete search history.

(56) References Cited

U.S. PATENT DOCUMENTS

| 6,604,237 | B1 * | 8/2003 | Giammaria | 717/174 |
| 7,296,035 | B2 * | 11/2007 | Polan et al. | 707/999.2 |
| 7,353,521 | B1 * | 4/2008 | Jin | 719/330 |

FOREIGN PATENT DOCUMENTS

| CN | 1241754 A | 1/2000 |
| CN | 101127630 A | 2/2008 |
| CN | 101286882 A | 10/2008 |
| KR | 20020078758 A | 10/2002 |
| WO | WO 2008/022590 A1 | 2/2008 |
| WO | WO 2008022590 A1 | 2/2008 |

OTHER PUBLICATIONS

Written Opinion of the International Searching Authority issued in corresponding PCT Patent Application No. PCT/CN2009/075286, mailed Mar. 18, 2010.

(Continued)

*Primary Examiner* — Andy Ho
(74) *Attorney, Agent, or Firm* — Brinks Hofer Gilson & Lione

(57) ABSTRACT

A method and device for managing an object instance label relate to network management technologies, and can implement uniform configuration for instances under different customer premises equipments (CPEs). The method for associating an object instance label includes: receiving a message for associating an object instance label, where the message includes an object instance and a corresponding label; and associating the label with the object instance according to the message, where the label is used to identify the object instance. The present invention is applicable to batch configuration for instances under different CPEs.

6 Claims, 2 Drawing Sheets

OTHER PUBLICATIONS

International Search Report issued in corresponding PCT Patent Application No. PCT/CN2009/075286, mailed Mar. 18, 2010.
"CWMP Scalability Extensions" DSL FORUM—Feb. 2008.
Extended European Search Report issued in corresponding European Patent Application No. 09832908.9, mailed Jul. 25, 2012.
ITU-T, "CORBA-based TMN Services: Extensions to Support Coarse-Grained Interfaces" ITU-T Recommendation Q.816.1, Aug. 2001.

CCITT, "Data Communication Networks: Information Technology—Open Systems Interconnection—Structure of Management Information: Management Information Model" International Telecommunication Union, X.720, Jan. 1992.

Office Action issued in corresponding Chinese Patent Application No. 200810184698.1, mailed Aug. 21, 2012.

* cited by examiner

METHOD AND DEVICE FOR MANAGING OBJECT INSTANCE LABEL

CROSS-REFERENCE TO RELATED APPLICATIONS

This application is a continuation of International Application No. PCT/CN2009/075286, filed on Dec. 3, 2009, which claims priority to Chinese Patent Application No. 200810184698.1, filed on Dec. 15, 2008, both of which are hereby incorporated by reference in their entireties.

FIELD OF THE INVENTION

The present invention relates to network management technologies, and in particular, to a method and device for managing an object instance label.

BACKGROUND OF THE INVENTION

With the development of network technologies and increase of network applications, networks become more and more complex and users raise higher requirements for network device management. Managed devices are scattered rather than centralized on a network due to network complexity. To manage these scattered managed devices, a network device management system must be used.

TR-069 is a standard formulated by the digital subscriber line (DSL) Forum. TR-069 describes the basic information of a customer premises equipment (CPE) in a tree structure. FIG. 1 shows a structure of a home gateway (HGW) data model 1.0 defined in TR-069. The following describes the data model shown in FIG. 1 in detail.

As shown in FIG. 1, the InterGatewayDevice is a root node, which includes many intermediate nodes and parameters, for example, DeviceInfo and Layer2Forwarding (only the two intermediate nodes are illustrated in FIG. 1). The two intermediate nodes also include many intermediate nodes or parameters. For example, the DeviceInfo node includes a Manufacturer parameter; the Layer2Forwarding node includes two instances of Forwarding besides DefaultConnectionService and ForwardNumberOfEntries. The instance numbers allocated by the CPE to the two instances of Forwarding are 1 and 2. In TR-069, the Forwarding node in Layer2Forwarding is an object, and Forwarding.1 and Forwarding.2 are two instances of the Forwarding object, which are differentiated by the instance numbers when being accessed.

TR-069 uniquely identifies a parameter or an intermediate node by using a path corresponding to the parameter or node, where the path is from the root to the parameter or node. For example, the path for accessing a common parameter is the concatenation of all successive nodes (including the parameter itself) separated by a dot, starting from the root and ending at the level where the parameter is located. Taking the Manufacturer parameter in DeviceInfo as an example, the path for accessing the parameter is:

InternetGatewayDevice.DeviceInfo.Mananufacturer.

The Remote Procedure Call (RPC) methods AddObject and DeleteObject provided by TR-069 may be used to add or delete a dynamic instance.

For example, if an instance is to be added for the InternetGatewayDevice.Layer2Forwarding.Forwarding object in the CPE data model shown in FIG. 1, the ObjectName parameter may be set to "InternetGatewayDevice.Layer2Forwarding.Forwarding." when the AddObject RPC method is invoked, that is, an instance of the object is created, and allocation of the instance number is determined by the CPE.

If an instance of an object is to be deleted, an instance number needs to be added after the object name. For example, if the InternetGatewayDevice.Layer2Forwarding.Forwarding.2 instance is to be deleted, the ObjectName parameter may be set to "InternetGatewayDevice.Layer2Forwarding.Forwarding.2." when the DeleteObject RPC method is invoked, that is, instance 2 of the object is deleted.

The foregoing method for managing object instances in the conventional art has the following disadvantages:

When an auto-configuration server (ACS) needs to invoke the AddObject RPC method of two different CPEs respectively to create instances of the InternetGatewayDevice.Layer2Forwarding.Forwarding object, two CPEs may return different instance numbers for the same object instance because the instance numbers are allocated by two different CPEs. For example, one CPE may return an instance number of 1, while the other CPE may return an instance number of 2. Instances created by different CPEs are as follows:

InternetGatewayDevice.Layer2Forwarding.Forwarding.1
InternetGatewayDevice.Layer2Forwarding.Forwarding.2

Therefore, when it is necessary to configure a same object instance of multiple CPEs through TR-069, TR-069 is required to access each CPE to configure each CPE in turn because the label of the same object instance may be inconsistent in different CPEs, that is, each CPE may return a different instance label (instance number); and TR-069 cannot use mechanisms such as multicast or broadcast and use a same command to perform batch configuration or access on the same object instance of the CPEs.

SUMMARY OF THE INVENTION

Embodiments of the present invention provide a method for managing object instances to solve the problem that the same object instance in different CPEs cannot be configured uniformly in the conventional art.

The embodiments of the present invention provide the following technical solution:

A method for associating an object instance label includes:
receiving a message for associating an object instance label, where the message includes an object instance and a corresponding label; and
associating the label with the object instance according to the message, where the label is used to identify the object instance.

Another embodiment of the present invention provides a method for associating an object instance label, including:
receiving a message for associating an object instance label, where the message includes a path parameter of an object instance to be created and a corresponding label parameter; and
creating the object instance according to the message and associating the label with the object instance, where the label is used to identify the object instance.

A method for deleting an object instance label includes:
receiving a message for deleting an object instance label, where the message includes an object instance name or object instance label to be deleted, and the object instance name includes an object instance path and an instance number; and
according to the label or the object instance corresponding to the object instance name, deleting an object instance, the label, and labels corresponding to all sub-object instances under the object instance.

An embodiment of the present invention also provides a device for managing an object instance label, including:

a receiving unit, configured to receive a message for associating an object instance label, where the message includes an object instance and a corresponding label; and a processing unit, configured to associate the label with the object instance according to the message, where the label is used to identify the object instance.

Another embodiment of the present invention provides a device for managing an object instance label, including:

a receiving unit, configured to receive a message for associating an object instance label, where the message includes a path parameter of an object instance to be created and a corresponding label parameter; and a processing unit, configured to create an object instance according to the message and associate the label with the object instance, where the label is used to identify the object instance.

Another embodiment of the present invention provides a device for managing an object instance label, including:

a receiving unit, configured to receive a message for deleting an object instance label, where the message includes an object instance name or object instance label to be deleted, and the object instance name includes an object instance path and an instance number; and a processing unit, configured to delete an object instance, the label, and labels corresponding to all sub-object instances under the object instance, according to the label or the object instance corresponding to the object instance name in the message.

In the method and device for managing an object instance label provided in the embodiments of the present invention, a message includes an object instance needed to be managed or a corresponding label, or includes a path parameter of an object instance or a corresponding label parameter. In this way, an object instance label can be associated with an existing object instance or a newly added object instance, or an object instance be deleted, or an object instance label can be disassociated from an object instance. Thereby, unified management is implemented for object instances, and batch configuration can be performed for the instances of same functions under different CPEs according to the object instance label.

DETAILED DESCRIPTION OF THE EMBODIMENTS

The method for managing object instances is described in detail hereinafter with reference to the exemplary embodiments and the accompanying drawings.

It should be specified that the embodiments are only part of rather than all of the embodiments of the present invention. All other embodiments, which can be derived by those of ordinary skill in the art from the embodiments described herein without creative efforts, shall fall within the protection scope of the present invention.

Figure 1:
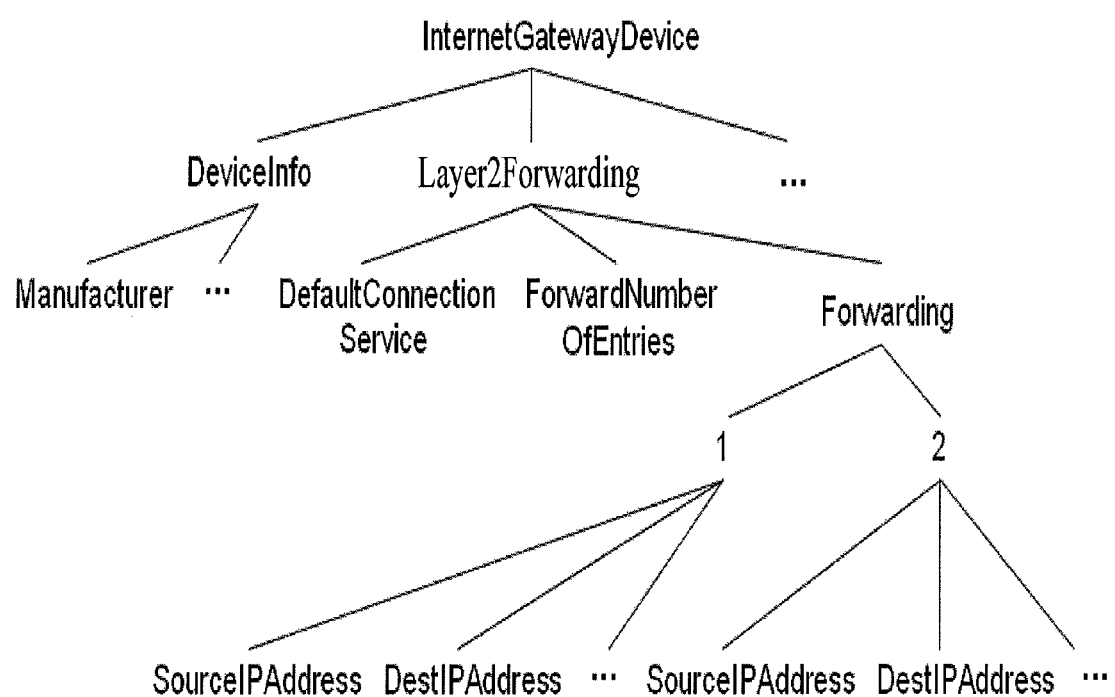
FIG. 1 shows a structure of an HGW data model 1.0 defined in TR-069.

In the following embodiments, it is assumed that an object instance label is associated with a corresponding object instance through a row of records in the mapping table between an object instance label and an object instance number. However, the present invention is not limited thereto. The mapping relation between an object instance label and a corresponding object instance may be embodied in different ways. All the following embodiments are based on the structure of the HGW data model 1.0 defined in TR-069 as shown in FIG. 1.

Embodiment 1

Figure 2:
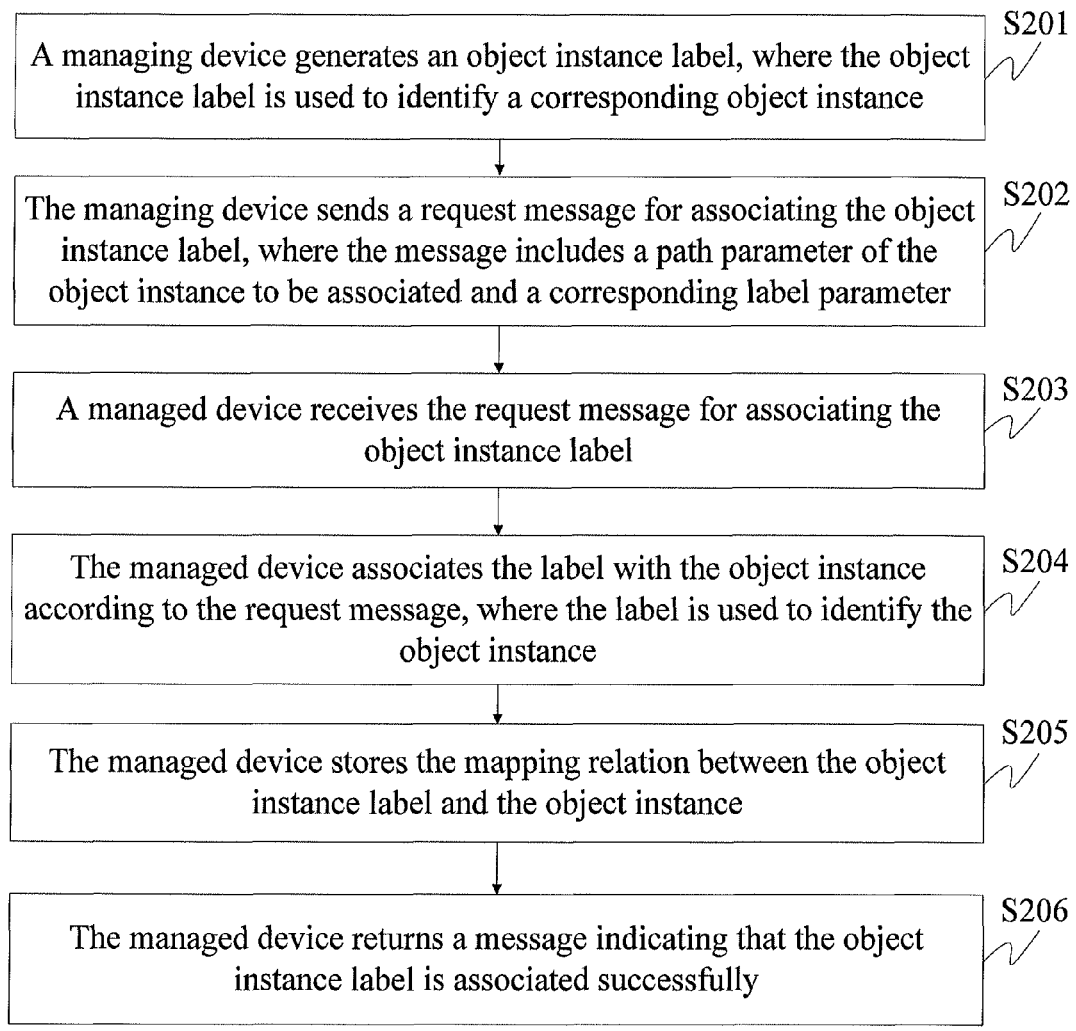
FIG. 2 is a flowchart of a method for associating an object instance label according to a first embodiment of the present invention.

As shown in FIG. 2, a method for an associating object instance label includes the following steps:

S201. A managing device creates an object instance label, where the object instance label is used to identify a corresponding object instance.

Here, the managing device may be an ACS. Specifically, for example, the managing device creates an object instance label "IPTVConnection". The label is used to identify an instance numbered 2 under the Forwarding object shown in FIG. 1.

S202. The managing device sends a request message for associating the object instance label, where the request message includes a path parameter of the object instance to be associated and a corresponding label parameter.

This step may be implemented by adding an RPC method of TR-069. The name of the added RPC method is "AddLabeltoinstance". The extended parameters are as shown in Table 1.

TABLE 1

Extended parameters of AddLabeltoinstance

| Parameter | Type | Description |
| --- | --- | --- |
| ObjectName | string (256) | Indicates the name of the object instance in the following format: "PathName.InstanceNumber." |
| Label | string (256) | Indicates the label of the object instance. |

The ACS invokes the RPC method AddLabeltoinstance ("InternetGatewayDevice.Layer2Forwarding.Forwarding.2.", "IPTVConnection") to add the object instance label "IPTVConnection" for an existing object instance InternetGatewayDevice.Layer2Forwarding.Forwarding.2.

S203. A managed device receives the request message for associating the object instance label.

Here, the managed device may be a CPE. After receiving the request message, the CPE determines the corresponding object instance 2 according to the object instance label "IPTVConnection".

S204. The managed device associates the label "IPTVConnection" with the object instance 2 according to the request message, where the label is used to identify the object instance.

After the CPE receives the AddLabeltoinstance RPC, if the object instance InternetGatewayDevice.Layer2Forwarding.Forwarding.2 already exists and the label "IPTVConnection" does not exist in the mapping table between an object instance label and an object instance number, a record is added to the mapping table between an object instance label and an object instance number, as shown in Table 2. As seen from the table, an object instance label corresponds to an object instance on a one-to-one basis.

For ease of description, the mapping table between an object instance label and an object instance number may also be as shown in Table 3. An object instance label field and an object instance number field are included in Table 3.

The mapping table between an object instance label and an object instance number may be implemented by either Table 2 or Table 3.

S205. The managed device stores the mapping relation between the object instance label "IPTVConnection" and the object instance 2.

TABLE 2

Mapping table between an object instance label and an object instance

| Object Instance Label | Object Instance |
|---|---|
| IPTVConnection | InternetGatewayDevice.Layer2Forwarding.Forwarding.2 |

TABLE 3

Mapping table between an object instance label and an object instance number

| Object Instance Label | Object Instance Number |
|---|---|
| IPTVConnection | 2 |

S206. The managed device returns a message indicating that the object instance label is associated successfully.

However, the present invention is not limited thereto. In the foregoing process of associating the object instance label, after the CPE receives the AddLabeltoinstance RPC, if the object instance InternetGatewayDevice.Layer2Forwarding.Forwarding.2 does not exist, the CPE returns a failure message, and the failure cause is that "The object instance does not exist".

After the CPE receives the AddLabeltoinstance RPC, if the object instance InternetGatewayDevice.Layer2Forwarding.Forwarding.2 already exists and the label "IPTVConnection" already exists in the mapping table between an object instance label and an object instance number, the CPE may proceed in either of the following two modes:

Mode 1: The CPE returns a failure message, and the failure cause is that "The object instance label is already used".

Mode 2: The CPE modifies the record corresponding to the label "IPTVConnection" in the mapping table between an object instance label and an object instance number, and modifies the object instance field corresponding to the record "IPTVConnection" to a new object instance. For example, if the object instance InternetGatewayDevice.Layer2Forwarding.Forwarding.3 corresponding to "IPTVConnection" already exists in the mapping table between an object instance label and an object instance, after the CPE receives the AddLabeltoinstance RPC, the CPE modifies the existing object instance field to the following value as shown in Table 2: InternetGatewayDevice.Layer2Forwarding.Forwarding.2. If the implementation mode shown in Table 3 is used, the object instance number field is modifies to the value 2 as shown in Table 3.

Embodiment 2

This embodiment intends to create an object instance and associate the object instance with a corresponding label.

The specific principle of this embodiment is as follows: In the conventional art, the ACS uses the AddObject RPC method of TR-069 to create a new instance of an object. According to this method, the path name of an object set of the new object instance is used as a parameter. For example, the path name parameter ObjectName is set to:

InternetGatewayDevice.Layer2Forwarding.Forwarding.

This parameter includes no instance number, that is, the instance number is allocated by the CPE; after the CPE executes the AddObject method, supposing the allocated instance number is 2, the ACS can access the instance through the following name: InternetGatewayDevice.Layer2Forwarding.Forwarding.2

The steps are based on the first embodiment, and will not be repeatedly described in the second embodiment. Only the implementation mode is described in brief.

First, the ACS creates an object instance object label "IPTVConnection".

In the TR-069 protocol, an AddObjectwithLabel RPC is added and sent. The AddObjectwithLabel RPC is used to create an object instance label. The extended parameters are as shown in Table 4.

TABLE 4

Extended parameters of AddObjectwithLabel

| Parameter | Type | Description |
|---|---|---|
| ObjectName | string (256) | Used as the path name of an object set of which a new instance needs to be added. For the path name, a dot must be added after the last node of the object level name. The definition of this parameter is the same as that of the existing ObjectName parameter of AddObject in BBF TR-069. |
| Label | string (256) | Indicates the object instance label specified for the newly added object instance. |
| ParameterKey | String(32) | Indicates the key word of a parameter. The definition of this parameter is the same as that of the existing ParameterKey parameter of AddObject in TR-069. |

The AddObjectwithLabel RPC is sent by the ACS. Supposing the ACS intends to create an object instance whose label is "IPTVConnection", the ObjectName parameter is "InternetGatewayDevice.Layer2Forwarding.Forwarding.", and the value of the Label parameter is "IPTVConnection".

Therefore, the request message includes the path parameter

"InternetGatewayDevice.Layer2Forwarding.Forwarding."
of the object instance to be created and the corresponding label parameter "IPTVConnection". The "IPTVConnection" parameter is used to identify the object instance to be created.

After receiving the AddObjectwithLabel RPC, the CPE creates the object instance and the label according to the request message, and determines the mapping relation between the instance and the label. Specifically, the CPE adds an object instance and allocates an instance number to the newly added object instance. The following makes analysis according to two different cases.

1. After the CPE receives the AddObjectwithLabel RPC, if the mapping table between an object instance label and an object instance number does not include the label "IPTVConnection", the CPE adds an instance, allocates an instance number to the instance, and adds a record related to the label "IPTVConnection" to the mapping table between an object instance label and an object instance. As shown in Table 2, a corresponding record is added for "IPTVConnection". Supposing the allocated instance number is 2, the value of the corresponding object instance field is "InternetGatewayDevice.Layer2Forwarding.Forwarding.2". By adding the RPC command, the corresponding object instance is added and an object instance label is specified for the object instance.

2. After the CPE receives the AddObjectwithLabel RPC, if the mapping table between an object instance label and an object instance number includes the label "IPTVConnection", the CPE does not add an object instance.

Finally, the CPE stores the mapping relation between the object instance label and the object instance, and returns a success or failure message, indicating the object instance label is created successfully or unsuccessfully.

As seen from the preceding embodiment, object instances of same functions on different CPEs may be set to have the same object instance label, so that these object instances of same functions on different CPEs can be configured uniformly according to the object instance label. In this embodiment of the present invention, the object instances of same functions under different CPEs can be associated with the same object instance label.

Embodiment 3

This embodiment provides a method for deleting an object instance label.

An object instance label may be deleted by adding an RPC method, and the name of the newly added RPC method may be DeleteObjectwithLabel. The extended parameters of the RPC method are as shown in Table 5.

TABLE 5

Extended parameters of DeleteObject RPCwithLabel

| Parameter | Type | Description |
| --- | --- | --- |
| ObjectName | string (256) | Used as the path name of an object set of which a new instance needs to be deleted. For the path name, a dot must be added after the last node of the object level name. If an object instance label corresponding to the object instance specified by the ACS needs to be used, the corresponding object instance label needs to be added after the path name of the object set to be deleted. The format is as follows: "PathName.{ObjectInstanceLabel}." |
| ParameterKey | String (32) | Indicates the key word of a parameter. |

Because the ACS intends to delete the instance label "IPTVConnection", the request message includes the label parameter "IPTVConnection" to be deleted.

The following makes analysis according to two cases.

1. Suppose the object instance and object instance label shown in Table 2 exist on the CPE. When the ACS intends to delete the object instance corresponding to the label "IPTVConnection", the ACS invokes the DeleteObjectwithLabel RPC, and the ObjectName parameter is:

InternetGatewayDevice.Layer2Forwarding.Forwarding.{IPTVConnection}.

When the CPE receives the DeleteObjectwithLabel RPC of the ACS, the CPE deletes the object instance InternetGatewayDevice.Layer2Forwarding.Forwarding.2., and deletes the record corresponding to the label "IPTVConnection" in the mapping table between an object instance label and an object instance number. If InternetGatewayDevice.Layer2Forwarding.Forwarding.2. includes sub-object instances, when deleting the sub-object instances, the CPE searches the mapping table between an object instance label and an object instance for the labels of the sub-object instances, and deletes the object instance labels corresponding to all sub-object instances.

2. Suppose the object instance number and object instance label shown in Table 3 exist on the CPE. When the ACS intends to delete the object instance corresponding to "IPTVConnection", the ACS invokes DeleteObjectwithLabel RPC, and the ObjectName parameter is:

InternetGatewayDevice.Layer2Forwarding.Forwarding.{IPTVConnection}.

When the CPE receives the DeleteObject RPC of the ACS, the CPE deletes the object instance InternetGatewayDevice.Layer2Forwarding.Forwarding.2., and deletes the record corresponding to the label "IPTVConnection" in the mapping table between an object instance label and an object instance number. If InternetGatewayDevice.Layer2Forwarding.Forwarding.2. includes sub-object instances, the CPE deletes the sub-object instances but does not delete the object instance labels corresponding to the sub-object instances in the mapping table between an object instance label and an object instance number. Because in Table 3, the CPE cannot find the label corresponding to the object instance. If the ACS uses the object instance label corresponding to a sub-object instance to execute operations such as setting CPE parameters subsequently, the CPE returns a failure message, and the failure cause is that "The object instance label does not exist".

Embodiment 4

This embodiment provides a method for deleting an object instance label.

If an object instance is deleted through the existing DeleteObject RPC in TR-069, ObjectName is expressed by an object instance number. The following makes analysis according to two cases.

1. The mapping table between an object instance label and an object instance is implemented by Table 2, and as shown in Table 2, the object instance label "IPTVConnection" already exists. If the ACS intends to delete the object instance corresponding to "IPTVConnection", ObjectName is expressed by an object instance number, that is, ObjectName is InternetGatewayDevice.Layer2Forwarding.Forwarding.2.; when the CPE receives the DeleteObject RPC of the ACS, the CPE deletes InternetGatewayDevice.Layer2Forwarding.Forwarding.2. and deletes the record corresponding to "InternetGatewayDevice.Layer2Forwarding.Forwarding.2." in the mapping table between an object instance label and an object instance that is, deletes the object instance label "IPTVConnection". If InternetGatewayDevice.Layer2Forwarding.Forwarding.2. includes sub-object instances, when deleting the sub-object instances, the CPE searches the mapping table between an object instance label and an object instance number for the object instance labels corresponding to the sub-object instances, and deletes the object instance labels corresponding to all sub-object instances.

2. The mapping table between an object instance label and an object instance number is implemented by Table 3, and as shown in Table 3, the object instance label "IPTVConnection" already exists. If the ACS intends to delete the object instance corresponding to the label "IPTVConnection", ObjectName is expressed by an object instance number, that is, ObjectName is InternetGatewayDevice.Layer2Forwarding.Forwarding.2. When the CPE receives the DeleteObject RPC of the ACS, the CPE deletes the object instance InternetGatewayDevice.Layer2Forwarding.Forwarding.2., but does not delete the record corresponding to "IPTVConnection" in the mapping table between an object instance label and an object instance number. Because in Table 3, the CPE cannot find the label corresponding to the object instance. If the ACS uses the object instance label corresponding to a sub-object instance to execute operations such as setting CPE parameters subsequently, the CPE returns a failure message, and the failure cause is that "The object instance label does not exist".

If InternetGatewayDevice.Layer2Forwarding.Forwarding.2. includes sub-object instances, the CPE deletes the sub-object instances but does not delete the object instance labels corresponding to the sub-object instances in the mapping table between an object instance label and an object instance number. If the ACS uses the object instance label corresponding to a sub-object instance to execute operations such as setting CPE parameters subsequently, the CPE returns a failure message, and the failure cause is that "The object instance label does not exist".

Embodiment 5

This embodiment provides a solution for deleting an object instance label and deleting a corresponding object instance when deleting the object instance label.

An object instance label may be deleted by adding an RPC method, and the name of the newly added RPC method may be DeleteLabel. The extended parameters of the RPC method are as shown in Table 6.

TABLE 6

Extended parameters of DeleteLabel

| Parameter | Type | Description |
| --- | --- | --- |
| Label | string (256) | Object instance label |

The following makes analysis according to two cases.

1. Suppose the object instance and object instance label as shown in Table 2 exist on the CPE. When the ACS intends to delete the object instance label "IPTVConnection", the ACS invokes the DeleteLabel RPC, and the Label parameter is "IPTVConnection".

When the CPE receives the DeleteLabel RPC of the ACS, the CPE deletes the record corresponding to the label "IPTVConnection" in the mapping table between an object instance label and an object instance, and deletes the object instance InternetGatewayDevice.Layer2Forwarding.Forwarding.2. If InternetGatewayDevice.Layer2Forwarding.Forwarding.2. includes sub-object instances, when deleting the sub-object instances, the CPE searches the mapping table between an object instance label and an object instance number for the object instance label corresponding to the sub-object instances, and deletes the object instance labels corresponding to all sub-object instances.

2. Suppose the object instance and object instance label shown in Table 3 exist on the CPE. When the ACS intends to delete the object instance label "IPTVConnection", the ACS invokes the DeleteLabel RPC, and the Label parameter is "IPTVConnection".

When receiving the DeleteLabel RPC of the ACS, the CPE deletes the record corresponding to the label "IPTVConnection" in the mapping table between an object instance label and an object instance number, and deletes the object instance InternetGatewayDevice.Layer2Forwarding.Forwarding.2. If InternetGatewayDevice.Layer2Forwarding.Forwarding.2. includes sub-object instances, the CPE deletes the sub-object instances but does not delete the object instance labels corresponding to the sub-object instances in the mapping table between an object instance label and an object instance number. If the ACS uses an object instance label corresponding to a sub-object instance to execute operations such as setting CPE parameters subsequently, the CPE returns a failure message, and the failure cause is that "The object instance label does not exist".

In the foregoing third, fourth, and fifth embodiments, object labels can be deleted, and the corresponding object instances can be deleted in batches by deleting an instance label.

Embodiment 6

The solution of this embodiment is adding an RPC method and deleting an existing object instance label through the RPC method.

Supposing the name of the added RPC method for deleting object instance labels is DelLabeltoinstance, the extended parameters are as shown in Table 7.

TABLE 7

Extended parameters of DelLabeltoinstance

| Parameter | Type | Description |
| --- | --- | --- |
| Label | string(256) | Object instance label |

Suppose the record shown in Table 2 or Table 3 already exists in the mapping table between an object instance label and an object instance number. When the ACS intends to disassociate the object instance label "IPTVConnection" from instance 2, the ACS can invoke the DelLabeltoinstance RPC, and the Label parameter is "IPTVConnection".

After the CPE receives the DelLabeltoinstance RPC, the CPE deletes the mapping relation between the object instance label and the object instance. Specifically, the CPE deletes the record corresponding to "IPTVConnection" in the mapping table between an object instance label and an object instance, but does not delete the object instance corresponding to "IPTVConnection". Thereby, the label "IPTVConnection" is disassociated from instance 2.

In the foregoing mode, an object instance label can be disassociated from an object instance, and thereby the same object instance label can be disassociated from the object instances of same functions under different CPEs in batches.

In addition, according to the embodiments of the present invention, uniform operations can be performed on instances under different CPEs through an object instance label.

For example, instances created by different CPEs for the IPTV service are as follows:

CPEA: InternetGatewayDevice.Layer2Forwarding.Forwarding.1

CPEB: InternetGatewayDevice.Layer2Forwarding.Forwarding.2

The object instance labels of the two instances are both "IPTVConnection".

If the two instances need to be deleted, a command such as DeleteObjectwithLabel RPC is used, and ObjectName is: InternetGatewayDevice.Layer2Forwarding.Forwarding.{IPTVConnection}.

This command can delete object instance 1 and object instance 2 on different CPEs.

For another example, if the value of the "SourceIPAddress" parameter in an object instance on different CPEs needs to be modified, a command such as SetParameterValues RPC is used, and the Name parameter is: InternetGateway-Device.Layer2Forwarding.Forwarding.{IPTVConnection}.SourceIPAddress This command can set parameters of the object instance on different CPEs.

The preceding "{ }" symbol is used to differentiate object instance labels and may be expressed by other symbols.

The present invention is not limited to the foregoing embodiments, and the purpose of obtaining or setting parameters of object instances may be achieved by adding an RPC method.

In the embodiments of the present invention, an RPC is added or modified, and an object instance label is specified in the RPC, or the relation between the object instance label and the object instance is specified. In this way, an object instance or a label is added or deleted, or an object instance label is specified for an existing object instance. Thereby, uniform configuration can be implemented for object instances of same functions according to the object instance labels quickly and effectively. The embodiments of the present invention can be compatible with the original TR-069 standard, improve the solution for associating, creating, and deleting object instance labels, implement the functions such as obtaining or setting parameters of object instances uniformly, and further provide a newly added RPC to implement the functions of associating or disassociating object instance labels with or from object instances.

Figure 3:
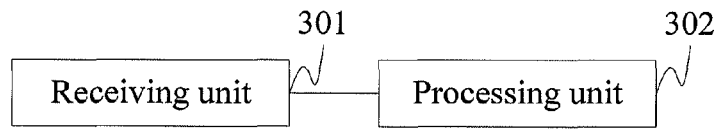
FIG. 3 is a schematic diagram of a device for managing an object instance label according to an embodiment of the present invention.

As shown in FIG. 3, an embodiment of the present invention also provides a device for managing an object instance label, including:

a receiving unit 301, configured to receive a message for associating an object instance label, where the message includes an object instance and a corresponding label; and a processing unit 302, configured to associate the label with the object instance according to the message, where the label is used to identify the object instance.

Another embodiment of the present invention also provides a device for managing an object instance label, including:

a receiving unit, configured to receive a message for associating an object instance label, where the message includes a path parameter of an object instance to be created and a corresponding label parameter; and a processing unit, configured to create an object instance according to the message and associate the label with the object instance, where the label is used to identify the object instance.

Another embodiment of the present invention also provides a device for managing an object instance label, including:

a receiving unit, configured to receive a message for deleting an object instance label, where the message includes an object instance name or object instance label to be deleted, and the object instance name includes an object instance path and an instance number; and a processing unit, configured to delete an object instance, the label, and labels corresponding to all sub-object instances under the object instance according to the label or the object instance corresponding to the object instance name in the message.

Still another embodiment of the present invention provides a device for managing an object instance label, including:

a receiving unit, configured to receive a message for disassociating an object instance label, where the message includes the object instance label to be disassociated; and a processing unit, configured to determine the object instance corresponding to the label and disassociate the label according to the message.

In the embodiments of the present invention, the device for managing an object instance label can implement uniform configuration for object instances of same functions according to object instance labels, and the object instance or the corresponding label that are included in the received message, or the path parameter of the object instance or the corresponding label parameter, thus implementing quick and effective operations. The embodiments of the present invention can be compatible with the original TR-069 standard, improve the solution for associating, creating, deleting object instance labels, and disassociating object instances from labels, and implement the functions such as obtaining or setting parameters of object instances uniformly.

It is understandable to those of ordinary skill in the art that all or part of the steps of the foregoing embodiments may be implemented by hardware instructed by a computer program. The program may be stored in a computer-readable storage medium. When being executed, the program performs the procedures covered in the foregoing embodiments. The storage medium may be a magnetic disk, a compact disk-read only memory (CD-ROM), a read only memory (ROM) or a random access memory (RAM).

Although the invention has been described through some exemplary embodiments, the invention is not limited to such embodiments. It is apparent that those skilled in the art can make various modifications and substitutions to the invention without departing from the scope of the invention. All these modifications and substitutions shall fall within the protection scope of the present invention. Therefore, the protection scope of the present invention is subject to the appended claims.

What is claimed is:

1. A method for associating an object instance label, comprising:
    creating by a managed device, an object instance;
    assigning by the managed device, an object instance number to the object instance;
    receiving by the managed device, a message sent from a managing device within a managed network, wherein the message is for associating an object instance label, and the message comprises the object instance number and a corresponding label; and
    associating by the managed device the label with the object instance number according to the message, wherein the label is used to identify the object instance in the managed network.

2. The method of claim 1, wherein the associating of the label with the object instance number comprising establishing a mapping relation between the object instance label and the object instance number.

3. The method of claim 1, wherein the object instance label is created by a managing device.

4. The method of claim 1, further comprising:
    storing by the managed device, the mapping relation between the object instance label and the object instance number.

5. The method of claim 1, wherein:
    if the label is already associated with another object instance, the method comprising, replacing by the managed device, the other object instance number with the object instance number of the message.

6. A device for managing an object instance label, comprising:

a creating unit, configured to create an object instance;

a assigning unit, configured to assign an object instance number to the object instance;

a receiving unit, configured to receive a message sent from a managing device within a managed network, wherein the message is for associating an object instance label, wherein the message comprises the object instance number and a corresponding label; and a processing unit, configured to associate the label with the object instance number according to the message, wherein the label is used to identify the object instance within the managed network.

* * * * *